United States Patent
Derian et al.

[11] Patent Number: 5,921,554
[45] Date of Patent: Jul. 13, 1999

[54] ANTI-PACK OUT SEAL

[75] Inventors: Gary A. Derian, Westlake; Michael W. Fleming, Lorain, both of Ohio; Cuong C. Tran, Ho Chi Minh, Viet Nam

[73] Assignee: Nordson Corporation, Westlake, Ohio

[21] Appl. No.: 08/893,495

[22] Filed: Jul. 11, 1997

Related U.S. Application Data

[63] Continuation of application No. 08/547,302, Oct. 24, 1995, abandoned.

[51] Int. Cl.$^6$ ............................................. F16J 15/16
[52] U.S. Cl. ..................... 277/516; 277/512; 277/549; 222/148; 222/386
[58] Field of Search ................... 277/15, 16, 19, 277/59, 309, 353, 512, 516, 549, 563, 918; 92/87; 222/918, 148, 388, 386, 504, 509

[56] References Cited

U.S. PATENT DOCUMENTS

| | | | |
|---|---|---|---|
| 3,357,706 | 12/1967 | Wilkinson | 277/15 |
| 3,943,717 | 3/1976 | Schexnayder | 277/59 |
| 4,363,357 | 12/1982 | Hunter | 277/31 |
| 4,474,382 | 10/1984 | Hjelsand | 277/59 |
| 4,901,888 | 2/1990 | Standlick | 222/145 |
| 5,135,238 | 8/1992 | Wells et al. | 277/15 |
| 5,209,495 | 5/1993 | Palmour | 277/15 |
| 5,403,169 | 4/1995 | Yokoi et al. | 277/59 |
| 5,499,745 | 3/1996 | Derian et al. | 222/136 |

FOREIGN PATENT DOCUMENTS

| | | |
|---|---|---|
| 1448530 | 9/1976 | United Kingdom. |
| 2106196 | 4/1983 | United Kingdom. |
| 2123097 | 1/1984 | United Kingdom. |

*Primary Examiner*—Daniel G. DePumpo
*Attorney, Agent, or Firm*—Wood, Herron & Evans, L.L.P.

[57] ABSTRACT

An anti-pack out seal for use between fluid containing cylinders and pistons which are axially slideable therein and which extend through an opening in the end of such pistons. This seal has an annular channel adjacent to a resilient elastomeric seal ring, through which channel, an air stream containing an oil mist is circulated to remove solid particles of material which may separate or pack out from the fluid in the cylinder and in addition to prevent curing of the solid particles between the cylinder, the elastomeric seal and the bearing surrounding the cylinder.

16 Claims, 3 Drawing Sheets

ANTI-PACK OUT SEAL

This application is a continuation of application Ser. No. 08/547,302, filed Oct. 24, 1995, now abandoned.

FIELD OF THE INVENTION

This invention relates to anti-pack out seals and in particular seals for use between fluid containing cylinders and pistons which are axially slideable therein and which extend through an opening in the end of such pistons. Such seals are needed to prevent leakage of fluid from between the piston or piston rod and the opening in the cylinder through which the piston extends.

BACKGROUND OF THE INVENTION

Various types of seals have been used to prevent leaking of fluid from actuator or metering cylinders in the area where a piston or piston rod passes through an opening in the end of the cylinder.

An example of cylinders needing such a seal may be found in U.S. Pat. No. 5,499,745 Darian et al, which was copending herewith. The cylinders in the above mentioned application are used for metering quantities of two different fluid materials such as a resin and a hardener to a mixing dispenser where the materials when mixed, become an epoxy adhesive. Various materials such as paint, gasket material and caulking materials can be mixed and dispensed from this type of equipment which is designed to assure that the proper quantities of each of the two materials is provided so that the mixture of the end product will function as intended.

When metering viscous materials through cylinders of the type described above one of the problems encountered is that either the material will start to cure up between the piston and the seal ring of the cylinder or solid particles will tend to separate from the liquid or oil type substance of the fluid material and will weep out past the seal ring and increase the friction in the area of the seal ring and may even cause the piston and piston rod to seize up. When the solid particles separate from the oil of the material the material is said to "pack out".

Some adhesive materials are anaerobic in nature. The packed out anaerobic materials in the seal area, being away from the air, will cure up in even less time than non anaerobic sealers.

To assure effective operation of the piston within the cylinder carrying this viscous type of material, it is important to prevent curing or packing out of the material in the area between the piston and the seal ring surrounding the piston.

OBJECTS OF THE INVENTION

An object of this invention is to provide a simple leakproof seal between a cylinder and a piston slideable therein which will prevent pack-out of solid particles from migrating along the piston and increasing friction between the piston and seal ring of the cylinder.

Another object of the invention is to prevent premature curing of fluid material being dispensed through a piston in the area of the seal ring surrounding the piston which curing would otherwise increase friction between the piston and the seal ring.

A still further object of this invention is to provide a seal between a piston and cylinder carrying a viscous material which will provide reliable operation of the piston without undue increase in friction or seizing.

Another object of this invention is to provide a seal which is effective for use with anaerobic materials to prevent premature curing in the seal area.

An even further object of this invention is to provide a means using an air stream for clearing the weepage of particles from the area of the seal ring to prevent curing of the particles in the seal ring area which could result in excess friction or seizing of the piston within the cylinder.

These and other objects of the invention will become for fully apparent as the description proceeds in the following specification and the attached drawings.

SUMMARY OF THE INVENTION

An anti-pack out seal unit for use between a fluid containing cylinder having a hollow chamber therein and a piston member extending from the chamber through an end opening in the cylinder and adapted for axial movement relative to the cylinder, the seal unit comprising: a cylindrical housing having an axial bore therethrough and adapted to be positioned in the end opening of the cylinder with the axial bore extending between the chamber of the cylinder and the exterior of the cylinder, a piston member extending axially through the bore of the housing with one end of the piston member inside the chamber and the opposite end outside the cylinder, resilient annular seal means mounted for sealing engagement between a radially inner surface of the bore the and a radially outer surface of the piston member to prevent fluid material from leaking out of the chamber, the seal means having an axially inner end facing toward the chamber and an axially outer end facing away from the chamber, means circulating a fluid cleaning stream around the piston member adjacent the axially outward end of the resilient seal means to remove weepage of solid particles which may migrate from the fluid in the chamber axially outwardly past the resilient seal means and to prevent curing of such solid particles in the area of the resilient seal means which would thereby increase the friction between the resilient seal means and the piston means.

DESCRIPTION OF THE PREFERRED EMBODIMENTS

Figure 1:
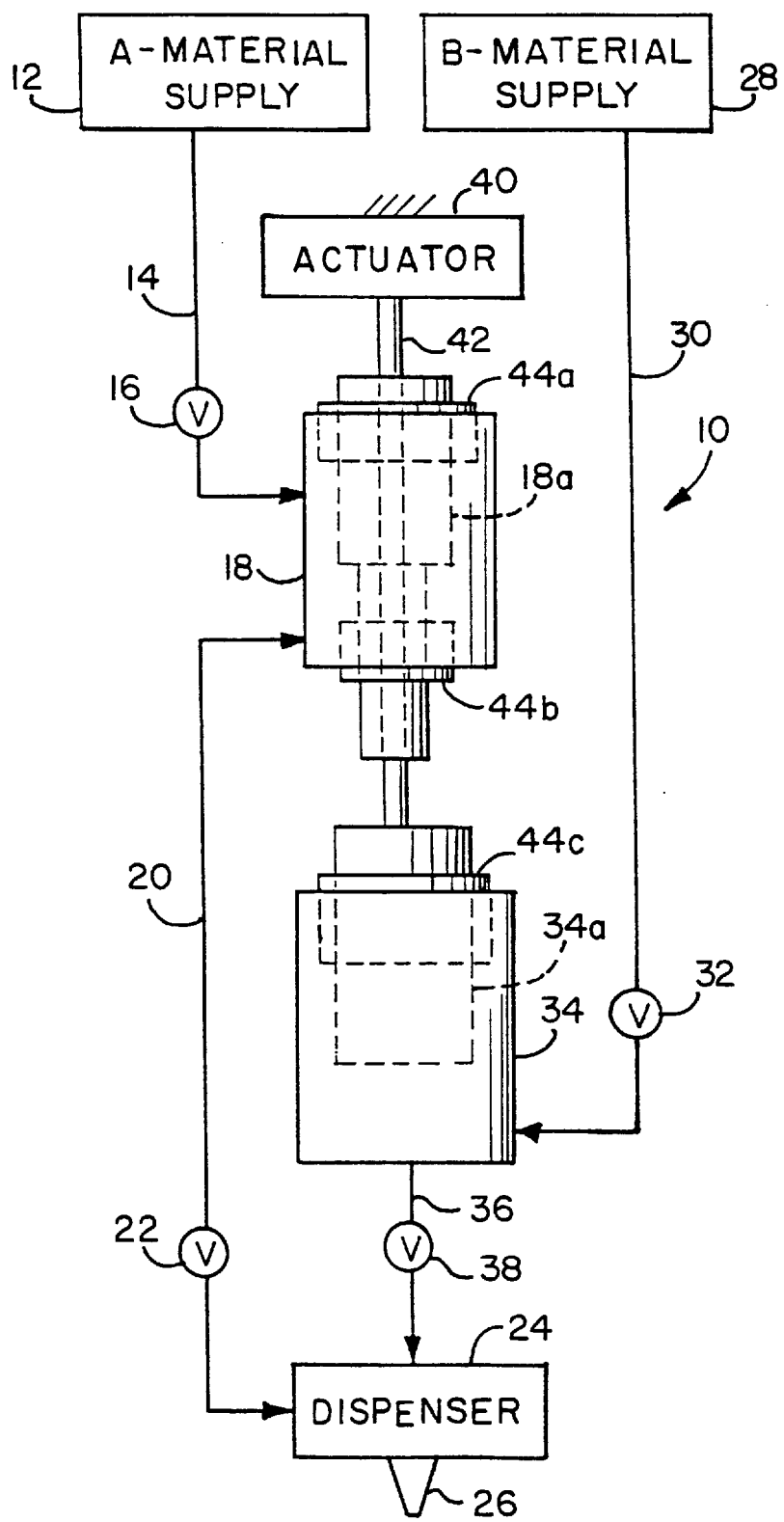
FIG. 1 is a diagrammatic view of a typical apparatus in which the anti-pack out seal of the invention can be used.

Referring to FIG. 1 of the drawings a two component dispensing system is indicated by the numeral 10. The system 10 dispenses measured quantities of material A and B which when mixed, form an adhesive material such as an epoxy glue or any desired adhesive. A material-A supply 12 is connected through inlet line 14 and valve 16 to a metering cylinder 18. An outlet line 20 extends through a valve 22 to a mixing dispenser 24 and then to a dispensing nozzle 26.

The cylinder 18, contains a piston 18a extending therefrom and axially moveable relative to the cylinder 18.

A material-B supply 28 is connected through inlet line 30 and valve 32 to a metering cylinder 34. An outlet line 36 extends through a valve 38 to the mixing dispenser 24 and then to the dispensing nozzle 26. The cylinder 34, contains a piston 34a extending therefrom and axially moveable within the cylinder 34.

An actuator 40 is connected through a piston rod 42 through the piston 18a and contacting piston 34a to cause movement of these pistons in cooperation with the materials A and B flowing into the cylinders 18 and 34.

Since this type of system is described in more detail in U.S. Pat. No. 5,499,745 now it will not be described in further detail, since the foregoing description of FIG. 1 is given merely to provide an environment for the anti-pack out seals of this invention.

The cylinder 18 contains two anti-pack out seals 44a and 44b mounted in each end of the cylinder 18 and through which the piston 18a passes. The cylinder 34 contains one anti-pack out seal 44c mounted in one end of the cylinder 34 and having the piston 34a passing therethrough.

Figure 2:
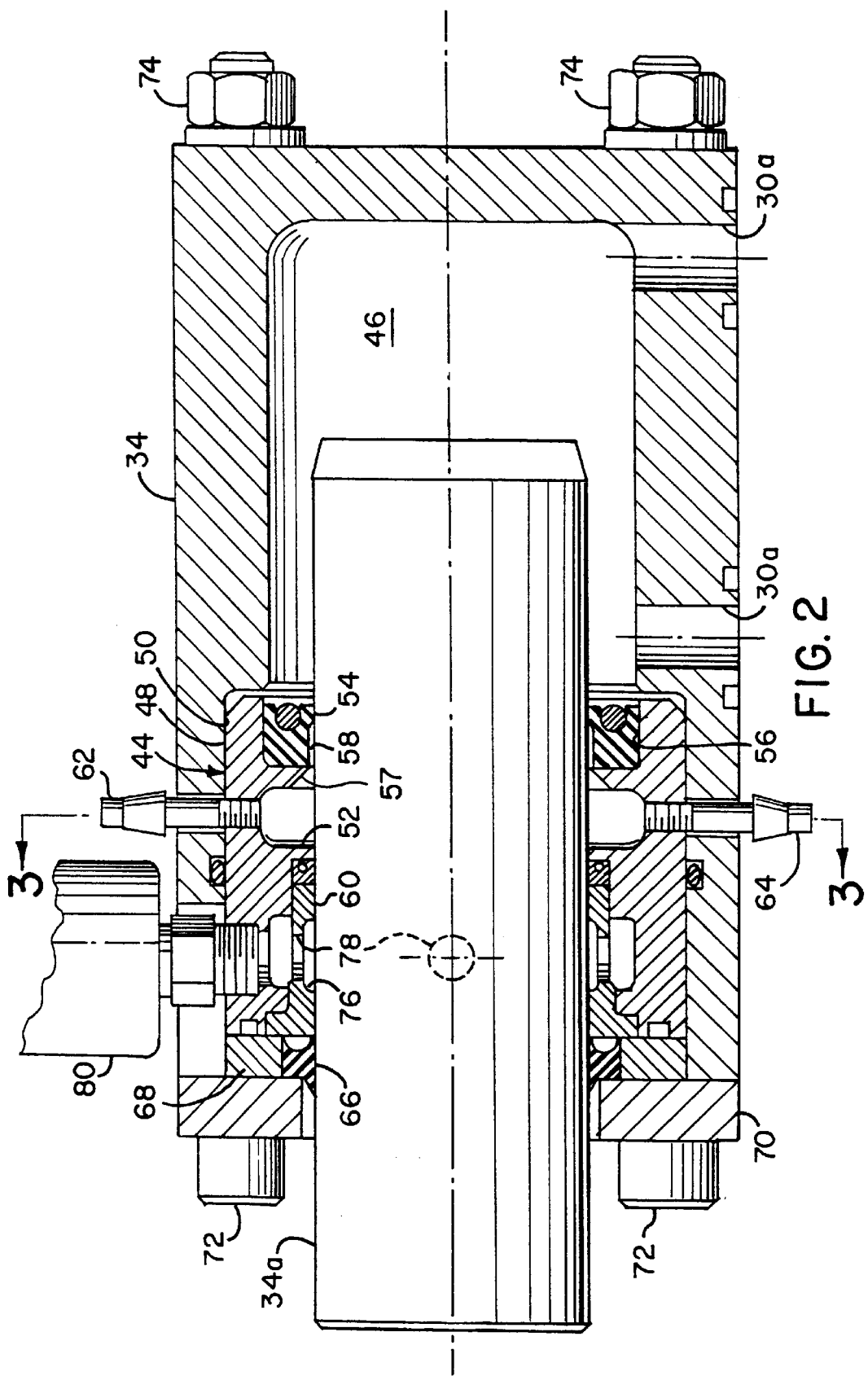
FIG. 2 is a cross-sectional view looking at the side of the seal assembly of the invention.
Figure 3:
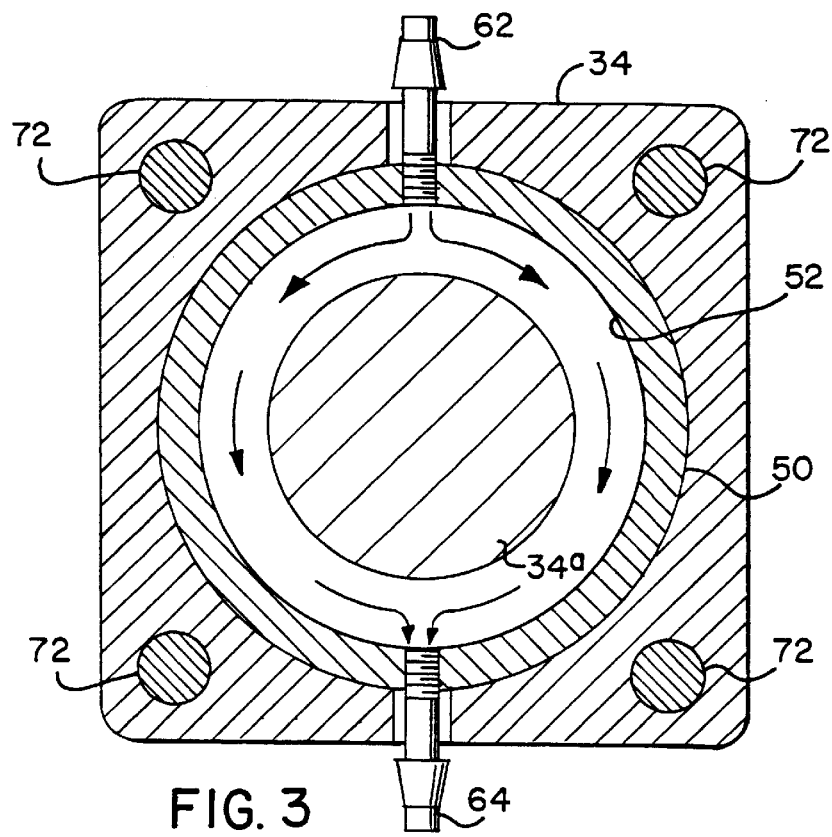
FIG. 3 is a cross-sectional view of the invention taken on line 3—3 of FIG. 2 looking in the direction of the end of the seal ring assembly.

The anti-pack out seals 44a, 44b and 44c are all similar to anti-pack out seal 44 shown in detail in FIGS. 2 and 3. For purposes of further description the seal is shown in FIG. 2 as being mounted in cylinder 34. The cylinder 34 has a cylindrical chamber 46 containing a piston 34a which is axially slideable therein through the anti-pack out seal assembly 44.

The cylinder 34 has inlet port 30a to receive inlet line 30 and outlet port 36a to receive outlet line 36. This permits the fluid material to flow in and out of the chamber depending upon the position of the piston 34a and the valve 32.

The anti-pack out seal assembly 44 has a substantially annular body housing 48 mounted in an annular recess 50 in the cylinder. The housing 48 has a radially inwardly facing annular channel 52 through which a cleaning stream of air containing an oil mist is circulated in communication with the piston 34a to remove weepage of solid particles of adhesive material which may migrate from the cylinder chamber 46 to the area of a resilient seal ring 54 mounted in an annular groove 56 in the housing 48. In addition the flow of the air carrying the oil mist passes from the channel 52 through an annular tapered open clearance space 57, between the housing 48 and the piston 34a which clearance space 57 directs the flow of oil mist air from the annular channel 52 into an annular clearance space 58 beneath part of the seal ring 54 to prevent curing of the solid particles which would otherwise increase friction between the cylinder 34b and the seal ring 54 and well as a bearing ring 60 mounted on the radially inner surface of the housing 48. By removing the solid particles from the surface of the piston 34a and adjacent contacting parts and by preventing curing of the solid particles, the friction of the piston is reduced thereby resulting in more effective operation of the piston and less chances of binding of the piston.

In the embodiment shown in FIGS. 2 and 3, the air flow to the channel 52 is received from an inlet line 62 at the top of the channel 52 and flows downwardly around both sides of the channel as shown in FIG. 3 to an outlet line 64 at the bottom of the channel 52.

A resilient wiping seal ring 66 is located around the cylinder 34a axially outwardly of the bearing ring 60. A spacer ring 68 surrounds the seal ring 66 and bears against the axially outer end of the housing 48 and the bearing ring 60.

A retaining plate 70 is attached to the cylinder 34 by bolts extending longitudinally through the corners of the square cylinder housing 34 as shown in FIGS. 2 and 3 and are held in place by nuts 74.

The retaining plate 70 holds the entire anti-pack out seal assembly 44 in position within the cylinder 34.

The bearing 60 is provided with an annular lubrication channel 76 receiving oil through radial holes 78 from an oil cup 80. This provides continuous lubrication on the radially outer surface of the piston 34a.

Figure 4:
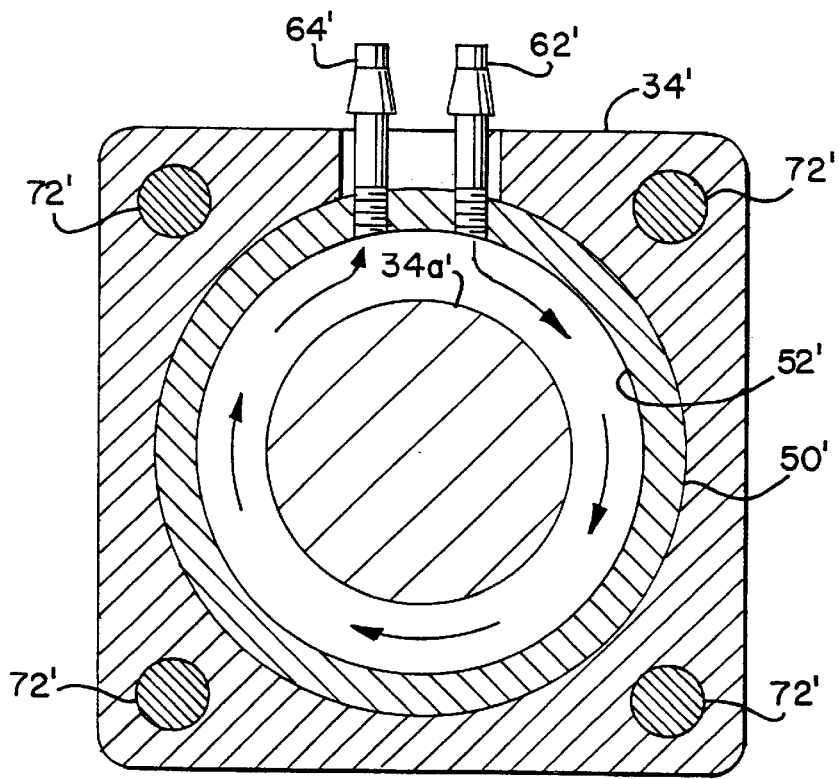
FIG. 4 is a cross-sectional view of another embodiment of the invention taken at a location similar to FIG. 3.

Referring to FIG. 4, for the purposes of simplicity, similar numerals have been used except that the parts are distinguished from the parts in FIG. 3, by the use of the prime symbol ('). The only difference between FIGS. 3 and 4 is that in FIG. 3 the inlet 62 is at the top and the outlet 64 is at the bottom. In FIG. 4, both the inlet 62' and the outlet 64' are at the top of the cylinder 34'.

The anti-pack out seal shown and described herein can be used with various types of cylinders carrying fluid materials.

In addition to the oil mist described herein, various mixtures of fluid cleaning streams can be circulated by a pump or other suitable means through the annular channel 52 adjacent the resilient seal 54 to perform the functions of this device. In some instances the fluid stream will be recirculated through the annular channel however, in some situations the fluid will pass through the channel only once and be collected in a holding container along with any solid particles which may have been removed by the fluid stream.

These and other modifications can be made in the embodiments shown and described herein without departing from the scope of the invention.

What is claimed is:

1. In combination with a cylinder containing an anaerobic first fluid material and a piston which is axially slideable therein, an anti-pack out seal comprising:

housing having a circular hole therethrough mounted in axial alignment with the cylinder at one end thereof;

the piston having one end inside the cylinder and extending from the cylinder through the circular hole to the outside of the housing, said piston adapted to exert dispensing pressure on the anaerobic fluid when moved axially into the cylinder;

a resilient annular seal ring fastened in the circular hole at an axially inward end of the housing, the seal ring having an axially inner end facing toward the inside of the cylinder and an axially outer end facing toward the outside of the cylinder, the seal ring having an annular seal clearance space between the seal ring and the piston extending axially inwardly from the axially outer end of the seal ring;

the housing having an annular channel located adjacent the seal ring at the axially outer end thereof;

an annular channel for circulating a non-anaerobic fluid containing air through the channel and the annular seal clearance space of the seal ring to prevent curing of the anaerobic fluid in the area of the resilient annular seal ring which would thereby increase the friction between the resilient annular seal ring and the piston;

the cross sectional contour of the housing being such as to provide an annular clearance space between the housing and the piston in the area between the annular channel and the annular seal clearance space of the resilient annular seal ring to provide open communication therebetween.

2. In combination with an anaerobic fluid containing cylinder in metering units carrying anaerobic material which cures in the absence of air, the cylinder having a hollow chamber therein and a piston slidably mounted in the chamber, an anti-pack out seal unit comprising:

the piston extending from the chamber through an end opening in the cylinder, and the piston exerting a dispensing pressure on the anaerobic fluid when moved axially toward the chamber;

a resilient annular seal mounted for sealing engagement between a radially inner surface of the end opening of the cylinder and a radially outer surface of the piston to prevent the anaerobic fluid material from leaking out of the chamber, the resilient annular seal forming an annular seal clearance space between the annular seal and the outer surface of the piston;

a cleaning fluid containing air; and an annular channel for circulating the cleaning fluid around the piston and in the annular seal clearance space of the resilient annular seal to prevent curing of the anaerobic fluid adjacent the resilient annular seal which would thereby increase the friction between the resilient annular seal means and the piston member;

the cross sectional contour of the cylinder being such as to provide an annular clearance space between the cylinder and the piston in the area between the annular channel and the annular seal clearance space of the resilient annular seal to provide open communication therebetween.

3. An anti-pack out seal as claimed in claim 2 wherein the annular channel is formed in the cylinder.

4. An anti-pack out seal as claimed in claim 3 wherein the annular channel is formed in an annular insert ring member mounted in the end opening of the cylinder.

5. An anti-pack out seal as claimed in claim 2 wherein the fluid cleaning stream is an oil mist carried in an air stream.

6. An anti-pack out seal as claimed in claim 2 wherein the annular channel has an inlet port at one peripheral location on the channel and an outlet port located approximately 180° from the inlet port.

7. An anti-pack out seal as claimed in claim 2 wherein the annular channel has an inlet port and an outlet port both located adjacent to each other at a peripheral location on the channel.

8. An anti-pack out seal and cylinder assembly comprising:

an anaerobic fluid;

a metering cylinder having an axial bore extending from an open end to a closed end of the cylinder;

a piston slidably mounted in the open end of the cylinder to form a chamber containing the anaerobic fluid at the closed end of the cylinder, the piston being axially movable in the cylinder to apply a dispensing pressure on the first anaerobic fluid;

a resilient annular seal ring mounted in an inner surface in the cylinder and contacting an outer surface of the piston to form an annular seal therewith and prevent the anaerobic fluid from leaking out of the chamber, and the seal ring having an annular clearance space between the annular seal and the piston;

a cleaning fluid containing air; and an annular channel disposed in the cylinder adjacent the seal ring and containing the cleaning fluid, the annular channel being in communication with the outer surface of the piston and intersecting the annular clearance space formed by the seal ring for circulating the cleaning fluid through the channel around the piston and through the annular clearance space formed by the seal ring to prevent the anaerobic fluid from curing in the annular clearance space adjacent the annular seal.

9. An anti-pack out seal and cylinder assembly of claim 8 wherein the cleaning fluid is an air suspended oil mist.

10. An anti-pack out seal and cylinder assembly of claim 8 wherein the annular channel has an inlet receiving the cleaning fluid and an outlet, thereby facilitating a continuous flow of the cleaning fluid through the annular channel and the annular clearance space.

11. An anti-pack out seal and cylinder assembly of claim 10 wherein the inlet is located on a periphery of the annular channel approximately diametrically opposite the outlet.

12. An anti-pack out seal and cylinder assembly of claim 10 wherein the inlet and outlet of the annular channel are located adjacent each other at a peripheral location on the annular channel.

13. An anti-pack out seal and cylinder assembly of claim 8 further comprising a bearing ring disposed in an inner surface in the cylinder between the annular channel and the open end of the cylinder, the bearing ring having an annular lubrication channel in communication with the outer surface of the piston for circulating a lubricant through the lubricating channel around the piston.

14. An anti-pack out seal and cylinder assembly of claim 8 further comprising:

a second anaerobic fluid;

a second metering cylinder having an axial bore extending from an open end to a closed end of the second cylinder;

a second piston slidably mounted in the open end of the second cylinder to form a second chamber containing the second anaerobic fluid at the closed end of the cylinder, the second piston being axially movable in the second cylinder to apply a dispensing pressure on the second anaerobic fluid;

a resilient annular second seal ring mounted in an inner surface in the second cylinder and contacting an outer surface of the second piston to form a second annular seal therewith and prevent the second anaerobic fluid from leaking out of the second chamber, the second seal ring having an annular clearance space between the second seal ring and the second piston;

a second annular channel disposed in an inner surface in the second cylinder adjacent the second seal ring and containing the cleaning fluid, the second annular channel being in communication with the outer surface of the second piston and intersecting the annular clearance space formed by the second seal ring for circulating the cleaning fluid containing air through the second annular channel around the second piston and through the second annular clearance space formed by the second seal ring to prevent the second anaerobic fluid from curing in the annular clearance space formed by the second annular seal.

15. An anti-pack out seal and cylinder assembly comprising:

an anaerobic fluid;

a metering cylinder having an axial bore extending from an open end to a closed end of the cylinder;

an annular housing disposed in the open end of the cylinder and having an axial bore;

a piston slidably mounted in the axial bore of the housing to form a chamber containing the anaerobic fluid at the closed end of the cylinder, the piston being axially movable in the housing and cylinder to apply a dispensing pressure on the anaerobic fluid;

a resilient annular seal ring mounted in an inner surface in the housing and contacting an outer surface of the piston to form an annular seal therewith and prevent the anaerobic fluid from leaking out of the chamber, and the seal ring having an annular clearance space between the annular seal and the outer surface of the piston;

a cleaning fluid containing air; and an annular channel disposed in an inner surface in the housing adjacent the seal ring and containing the cleaning fluid, the annular channel being in communication with the outer surface of the piston and intersecting the annular clearance space formed by the seal ring for circulating the cleaning fluid through the channel around the piston and through the annular clearance space formed by the seal ring to prevent the anaerobic fluid from curing in the annular clearance space adjacent the annular seal and to remove the anaerobic fluid from the annular clearance space and the annular channel.

16. A method of cleaning an anaerobic fluid from around a seal ring located between a dispensing cylinder and a piston, the piston being slidably mounted in the cylinder to form a chamber containing the anaerobic fluid at a closed end of a cylinder, the method comprising:

filling the chamber in the cylinder with an anaerobic fluid;

moving the piston toward the closed end of the cylinder to apply a dispensing pressure on the anaerobic fluid, a portion of the anaerobic fluid weeping beneath a seal of the seal ring;

circulating a cleaning fluid containing air through an annular channel disposed in an inner surface of the cylinder and in communication with the piston; and circulating the cleaning fluid through an annular clearance space formed between the seal ring and the outer surface of the piston and intersecting the annular channel to prevent the anaerobic fluid from curing in the annular clearance space adjacent the annular seal and further to remove uncured anaerobic fluid from the annular clearance space and the annular channel.

* * * * *

UNITED STATES PATENT AND TRADEMARK OFFICE
CERTIFICATE OF CORRECTION

PATENT NO. : 5,921,554

DATED : July 13, 1999

INVENTOR(S) : Gary A. Derian et al.

It is certified that error appears in the above-identified patent and that said Letters Patent is hereby corrected as shown below:

Claim 1, column 4, line 31, before "housing" insert --a--.

Claim 1, column 4, line 47, delete "non-anaerobic".

Signed and Sealed this

Seventeenth Day of October, 2000

Attest:

Q. TODD DICKINSON

*Attesting Officer*  *Director of Patents and Trademarks*